United States Patent
Choi et al.

(10) Patent No.: US 12,503,588 B2
(45) Date of Patent: Dec. 23, 2025

(54) THERMOPLASTIC POLYESTER ELASTOMER RESIN COMPOSITION, METHOD OF PREPARING THE SAME, AND MOLDED ARTICLE INCLUDING THE SAME

(71) Applicant: LG CHEM, LTD., Seoul (KR)

(72) Inventors: Sungmoon Choi, Daejeon (KR); Kyuyoung Kim, Daejeon (KR); Soojin Sim, Daejeon (KR); Ho Joon Park, Daejeon (KR); Sun Mo Son, Daejeon (KR)

(73) Assignee: LG CHEM, LTD., Seoul (KR)

( * ) Notice: Subject to any disclaimer, the term of this patent is extended or adjusted under 35 U.S.C. 154(b) by 487 days.

(21) Appl. No.: 18/021,105

(22) PCT Filed: Aug. 12, 2022

(86) PCT No.: PCT/KR2022/012068
§ 371 (c)(1),
(2) Date: Feb. 13, 2023

(87) PCT Pub. No.: WO2023/075104
PCT Pub. Date: May 4, 2023

(65) Prior Publication Data
US 2024/0247143 A1 Jul. 25, 2024

(30) Foreign Application Priority Data

Oct. 27, 2021 (KR) .................. 10-2021-0144938
Aug. 10, 2022 (KR) .................. 10-2022-0099866

(51) Int. Cl.
*C08L 67/02* (2006.01)
*C08J 3/00* (2006.01)

(52) U.S. Cl.
CPC .............. *C08L 67/02* (2013.01); *C08J 3/005* (2013.01); *C08J 2367/02* (2013.01); *C08J 2423/08* (2013.01); *C08J 2423/26* (2013.01); *C08L 2207/04* (2013.01)

(58) Field of Classification Search
CPC ....... C08L 67/02; C08L 23/0876; C08L 15/00
See application file for complete search history.

(56) References Cited

U.S. PATENT DOCUMENTS

| | | | |
|---|---|---|---|
| 2002/0033589 A1 | 3/2002 | Barnes | |
| 2011/0294955 A1* | 12/2011 | Akiba | C08L 71/12 525/173 |
| 2014/0058019 A1 | 2/2014 | Na et al. | |
| 2015/0267049 A1* | 9/2015 | Kim | C08L 67/025 524/186 |
| 2021/0189116 A1 | 6/2021 | Choi et al. | |

FOREIGN PATENT DOCUMENTS

| | | |
|---|---|---|
| CN | 112689659 A | 4/2021 |
| EP | 3822318 A1 | 5/2021 |
| JP | 2003-221493 | 8/2003 |
| JP | 2008-201866 | 9/2008 |
| JP | 5066822 | 11/2012 |
| JP | 2016-079226 | 5/2016 |
| KR | 10-2002-0082870 | 10/2002 |
| KR | 10-2010-0049362 | 5/2010 |
| KR | 10-1242686 | 3/2013 |
| KR | 10-1484390 | 1/2015 |
| KR | 10-1632101 | 6/2016 |
| KR | 10-2019-0075506 | 7/2019 |
| KR | 10-2019-0075506 A | 7/2019 |
| KR | 10-2020-0074564 | 6/2020 |
| KR | 10-2020-0074564 A | 6/2020 |
| KR | 10-2020-0077874 | 7/2020 |
| KR | 10-2021-0020785 | 2/2021 |

* cited by examiner

*Primary Examiner* — Robert C Boyle
(74) *Attorney, Agent, or Firm* — Bryan Cave Leighton Paisner LLP

(57) ABSTRACT

Provided is a thermoplastic polyester elastomer resin composition, a method of preparing the polyester elastomer resin composition, and a molded article including the polyester elastomer resin composition. The thermoplastic polyester elastomer resin composition includes 89 to 96 wt % of a thermoplastic polyester elastomer resin (A); 1.5 to 5.5 wt % of a glycidyl group-modified olefin-based rubber polymer (B); and 1.5 to 5.5 wt % of an ionomer resin (C). The thermoplastic polyester elastomer resin composition has excellent mechanical properties and moldability; is capable of suppressing occurrence of flow marks on the inner surface of a molded article; and thus is applicable to a constant velocity joint boot.

14 Claims, 1 Drawing Sheet

[FIG. 1]

Example 3

Comparative Example 6

[FIG. 2]

THERMOPLASTIC POLYESTER ELASTOMER RESIN COMPOSITION, METHOD OF PREPARING THE SAME, AND MOLDED ARTICLE INCLUDING THE SAME

CROSS-REFERENCE TO RELATED APPLICATIONS

This application is a National Stage Application of International Application No. PCT/KR2022/012068 filed on Aug. 12, 2022, which claims priority to Korean Patent Application No. 10-2021-0144938, filed on Oct. 27, 2021, and Korean Patent Application No. 10-2022-0099866, re-filed on Aug. 10, 2022, based on the priority of the above patent, in the Korean Intellectual Property Office, the disclosures of each of which are incorporated herein by reference.

TECHNICAL FIELD

The present invention relates to a thermoplastic polyester elastomer resin composition, a method of preparing the same, and a molded article including the same. More particularly, the present invention relates to a high-quality thermoplastic polyester elastomer resin composition having excellent hardness and mechanical properties; having excellent moldability due to high melt tension; being capable of suppressing occurrence of flow marks on the inner surface of a molded article; and thus, being applicable to automobile parts, in particular a constant velocity joint boot (CVJB), a method of preparing the thermoplastic polyester elastomer resin composition, and a molded article including the thermoplastic polyester elastomer resin composition.

BACKGROUND

With the development of automobile technology, modularization of automobile parts is being actively performed. In particular, in the case of an automobile having a front-engine/front-drive (FF) system, a front-wheel module is responsible for various functions such as acceleration/deceleration, impact absorption, and steering. When force generated from the engine of an automobile directly acts on wheels, impact absorbed through the wheels is transmitted to the engine, resulting in deterioration of durability. In this case, the required automobile part is a constant velocity joint (CVJ). By the action of the constant velocity joint, force generated from an engine is transmitted to a transmission through an output shaft, and the force transmitted to the transmission is uniformly transmitted through the shafts of each wheel, so that both wheels rotate at a constant velocity. To secure constant velocity, the internal components of a constant velocity joint are set to be placed in a predetermined position. To secure the function of a constant velocity joint, that is, to prevent internal heat generated due to continuous friction between the internal components of the constant velocity joint from increasing above a certain temperature, and to facilitate the predetermined movement of the internal components, grease as a lubricant is applied to the constant velocity joint.

A constant velocity joint (CVJ) boot is an internal component that resists heat generated from a constant velocity joint, prevents leakage of grease, and protects the constant velocity joint from foreign substances. The constant velocity joint boot rotates together in the process of transmitting force to wheels. At this time, due to friction between the surfaces of the pleats of the boot, noise is generated. In addition, when various foreign substances such as water, salt water (e.g., calcium chloride), and sand are introduced from the road surface to the lower part of an automobile and the constant velocity joint boot is contaminated, a loud noise of 90 dB or more can be generated.

Meanwhile, conventionally, cross-linked rubber such as chloropropene rubber has been used as a material for a constant velocity joint boot. Recently, in line with the trend of weight reduction and eco-friendliness of automobiles, a thermoplastic polyester elastomer resin having a low specific gravity and being easily recycled is mainly used. A constant velocity joint boot is manufactured by compounding a polyester elastomer resin with a lubricant to secure friction resistance, scratch resistance, and noise resistance.

To manufacture a constant velocity joint boot through molding using a thermoplastic polyester elastomer resin, it is necessary to increase the viscosity of the resin by increasing the molecular weight thereof. In this case, a chain extender is added to the resin to increase the viscosity thereof through formation of chemical bonds. As the amount of the chain extender added to the resin increases, the viscosity of the resin increases. However, when an excess of the chain extender is added, the discharge pressure of a nozzle increases during molding due to a gelation phenomenon, and an excessive load is applied to a molding machine. In addition, the inner surface of the boot becomes rough, resulting in poor appearance, and weight variation and lot-to-lot variation increase due to non-uniform molecular weight. On the other hand, when the viscosity of the resin is low, since the melt viscosity of parison is reduced, molding may not be performed, or deviation in the thickness of the boot may increase, resulting in reduction in durability or leakage of grease.

Therefore, development of a material capable of improving moldability and internal appearance is required.

RELATED ART DOCUMENTS

Patent Documents

KR 10-1242686 B1

BRIEF DESCRIPTION

Technical Problem

Therefore, the present invention has been made in view of the above problems, and it is one object of the present invention to provide a high-quality thermoplastic polyester elastomer resin composition having excellent hardness and mechanical properties; having excellent moldability due to high melt tension; being capable of suppressing occurrence of flow marks on the inner surface of a molded article; and thus being applicable to automobile parts, in particular a constant velocity joint boot (CVJB).

It is another object of the present invention to provide a method of preparing the thermoplastic polyester elastomer resin composition.

It is yet another object of the present invention to provide a molded article manufactured using the thermoplastic polyester elastomer resin composition.

The above and other objects can be accomplished by the present invention described below.

Technical Solution

In accordance with one aspect of the present invention, provided is a thermoplastic polyester elastomer resin composition including 89 to 96% by weight of a thermoplastic polyester elastomer resin (A); 1.5 to 5.5% by weight of a glycidyl group-modified olefin-based rubber polymer (B); and 1.5 to 5.5% by weight of an ionomer resin (C).

In addition, the present invention can provide a thermoplastic polyester elastomer resin composition including 89 to 96% by weight of a thermoplastic polyester elastomer resin (A); 1.5 to 5.5% by weight of a glycidyl group-modified olefin-based rubber polymer (B); and 1.5 to 5.5% by weight of an ionomer resin (C), wherein, when thermoplastic polyester elastomer resin composition pellets are discharged in a form of sheet through a T-die (die width: 150 mm, die thickness: 1.5 T) at 60 rpm and a cylinder temperature of 230° C. using a single-screw extruder (screw diameter: 30 Φ, screw length: 1 m), and time taken for the sheet discharged from the T-die to drop from a height a distance of 120 cm, i.e., drop time, is measured, the thermoplastic polyester elastomer resin composition has a drop time of 60 to 120 seconds.

The thermoplastic polyester elastomer resin composition can have a melt flow rate of preferably 5 to 16 g/10 min as measured at 230° C. under a load of 10 kg according to ISO 1133.

The thermoplastic polyester elastomer resin (A) can have a melt flow rate of preferably 0.5 to 10 g/10 min as measured at 230° C. under a load of 2.16 kg according to ISO 1133.

The thermoplastic polyester elastomer resin (A) can be preferably an elastomer resin including an aromatic dicarboxylic acid or an ester-forming derivative thereof; an aliphatic diol; and a polyalkylene oxide.

The aromatic dicarboxylic acid can include preferably one or more selected from the group consisting of terephthalic acid, isophthalic acid, 2,6-naphthalene dicarboxylic acid, 1,5-naphthalene dicarboxylic acid, and 1,4-cyclohexane dicarboxylic acid.

The ester-forming derivative of the aromatic dicarboxylic acid can include preferably one or more selected from the group consisting of dimethyl terephthalate, dimethyl isophthalate, 2,6-dimethyl naphthalene dicarboxylate, and dimethyl 1,4-cyclohexane dicarboxylate.

The aliphatic diol can include preferably one or more selected from the group consisting of ethylene glycol, propylene glycol, 1,2-propanediol, 1,3-propanediol, 1,4-butanediol, 1,5-pentanediol, 1,6-hexanediol, and 1,4-cyclohexanedimethanol.

The polyalkylene oxide can include preferably one or more selected from the group consisting of polyethylene glycol, polypropylene glycol, polytetramethylene glycol, polyhexamethylene glycol, a copolymer of ethylene oxide and propylene oxide, an ethylene oxide addition polymer of polypropylene glycol, and a copolymer of ethylene oxide and tetrahydrofuran.

The glycidyl group-modified olefin-based rubber polymer (B) can be preferably a polymer (glycidyl (meth)acrylate-grafted polyolefin elastomer) obtained by graft-polymerizing glycidyl (meth)acrylate onto a polyolefin-based rubber copolymer.

Based on a total weight of the glycidyl group-modified olefin-based rubber polymer (B), the glycidyl group-modified olefin-based rubber polymer (B) can include preferably 6 to 20% by weight of glycidyl (meth)acrylate.

The ionomer resin (C) can preferably include a carboxyl group or sulfonic acid group in which a hydrogen ion is substituted with a metal cation.

The thermoplastic polyester elastomer resin composition can include preferably one or more selected from the group consisting of an antioxidant, a light stabilizer, a lubricant, and a black masterbatch.

In accordance with another aspect of the present invention, provided is a method of preparing a thermoplastic polyester elastomer resin composition, the method including preparing pellets by kneading and extruding 89 to 96% by weight of a thermoplastic polyester elastomer resin (A), 1.5 to 5.5% by weight of a glycidyl group-modified olefin-based rubber polymer (B), and 1.5 to 5.5% by weight of an ionomer resin (C) at 200 to 300° C. and 150 to 350 rpm.

In addition, the present invention can provide a method of preparing a thermoplastic polyester elastomer resin composition, the method including preparing pellets by kneading and extruding 89 to 96% by weight of a thermoplastic polyester elastomer resin (A), 1.5 to 5.5% by weight of a glycidyl group-modified olefin-based rubber polymer (B), and 1.5 to 5.5% by weight of an ionomer resin (C) at 200 to 300° C. and 150 to 350 rpm, wherein, when the prepared pellets are discharged in a form of sheet through a T-die (die width: 150 mm, die thickness: 1.5 T) at 60 rpm and a cylinder temperature of 230° C. using a single-screw extruder (screw diameter: 30 Φ, screw length: 1 m), and time taken for the sheet discharged from the T-die to drop from a height a distance of 120 cm, i.e., drop time, is measured, the drop time is 60 to 120 seconds.

In accordance with yet another aspect of the present invention, provided is a molded article including the thermoplastic polyester elastomer resin composition.

Advantageous Effects

The present invention has an effect of providing a thermoplastic polyester elastomer resin composition having excellent hardness and mechanical properties; having excellent moldability due to high melt tension; and being capable of implementing an excellent appearance by minimizing occurrence of flow marks on the inner surface of a molded article, a method of preparing the thermoplastic polyester elastomer resin composition, and a molded article including the thermoplastic polyester elastomer resin composition.

In addition, the thermoplastic polyester elastomer resin composition of the present invention can satisfy the physical properties required for automobile parts, in particular a constant velocity joint boot (CVJB), and can provide superior moldability and surface appearance than conventional resin compositions. Thus, when the thermoplastic polyester elastomer resin composition of the present invention is applied to constant velocity joint boots, rack and pinion boots, propeller shaft boots, dust covers, or bellows, the quality thereof can be greatly improved.

DETAILED DESCRIPTION

Hereinafter, a thermoplastic polyester elastomer resin composition, a method of preparing the same, and a molded article including the same according to the present invention will be described in detail.

The present inventors confirmed that, when a certain amount of a combination of a glycidyl group-modified olefin-based rubber polymer and an ionomer resin was included in a thermoplastic polyester elastomer resin, a thermoplastic polyester elastomer resin composition having excellent hardness and mechanical properties; having excellent moldability due to high melt tension thereof; and being capable of suppressing occurrence of flow marks on the inner surface of a molded article could be obtained. Based on these results, the present inventors conducted further studies to complete the present invention.

The thermoplastic polyester elastomer resin composition according to the present invention will be described in detail as follows.

The thermoplastic polyester elastomer resin composition of the present invention includes 89 to 96% by weight of a thermoplastic polyester elastomer resin (A); 1.5 to 5.5% by weight of a glycidyl group-modified olefin-based rubber polymer (B); and 1.5 to 5.5% by weight of an ionomer resin (C). In this case, hardness and mechanical properties can be excellent, moldability can be excellent due to high melt tension, occurrence of flow marks on the inner surface of a blow-molded article can be minimized, and thus a high-quality thermoplastic polyester elastomer resin composition can be applied to automobile parts, in particular a constant velocity joint boot.

Hereinafter, each component of the thermoplastic polyester elastomer resin composition of the present invention will be described in detail.

A) Thermoplastic Polyester Elastomer Resin

For example, based on a total weight of components (A) to (C), the thermoplastic polyester elastomer resin (A) can be included in an amount of 89 to 96% by weight, preferably 89 to 95% by weight, more preferably 90 to 95% by weight, still more preferably 91 to 95% by weight, still more preferably 93 to 95% by weight. Within this range, hardness, mechanical properties, and fluidity can be excellent.

For example, the thermoplastic polyester elastomer resin (A) can be an elastomer resin including an aromatic dicarboxylic acid or an ester-forming derivative thereof; an aliphatic diol; and a polyalkylene oxide. In this case, flexibility, mechanical strength, and heat resistance can be increased, and excellent balance can be realized.

A crystalline hard segment can be formed from the aromatic dicarboxylic acid or the ester-forming derivative thereof and the aliphatic diol, and a soft segment can be formed from the polyalkylene oxide. For example, the crystalline hard segment and the soft segment can be randomly arranged.

For example, the aromatic dicarboxylic acid can include one or more selected from the group consisting of terephthalic acid, isophthalic acid, 2,6-naphthalene dicarboxylic acid, 1,5-naphthalene dicarboxylic acid, and 1,4-cyclohexane dicarboxylic acid, preferably terephthalic acid, isophthalic acid, or a mixture thereof.

For example, the ester-forming derivative of the aromatic dicarboxylic acid can include one or more selected from the group consisting of dimethyl terephthalate, dimethyl isophthalate, 2,6-dimethyl naphthalene dicarboxylate, and dimethyl 1,4-cyclohexane dicarboxylate, preferably dimethyl terephthalate, dimethyl isophthalate, or a mixture thereof.

Based on a total weight of the thermoplastic polyester elastomer resin, the aromatic dicarboxylic acid or the ester-forming derivative thereof can be included in an amount of 25 to 70% by weight, preferably 30 to 62% by weight, more preferably 35 to 55% by weight. Within this range, reaction can be easily performed due to excellent reaction balance.

The aliphatic diol can include preferably one or more selected from the group consisting of ethylene glycol, propylene glycol, 1,2-propanediol, 1,3-propanediol, 1,4-butanediol, 1,5-pentanediol, 1,6-hexanediol, and 1,4-cyclohexanedimethanol, more preferably 1,4-butanediol.

For example, the aliphatic diol can be a diol having a number average molecular weight of 300 g/mol or less, preferably 60 to 300 g/mol.

In the present disclosure, unless otherwise defined, number average molecular weight can be measured using gel permeation chromatography (GPC, Waters Breeze). As a specific example, number average molecular weight can be measured using tetrahydrofuran (THF) as an eluate through gel permeation chromatography (GPC, Waters Breeze). In this case, number average molecular weight is obtained as a relative value to a polystyrene (PS) standard sample. As a specific measurement example, number average molecular weight can be measured under conditions of solvent: THF, column temperature: 40° C., flow rate: 0.3 ml/min, sample concentration: 20 mg/ml, injection amount: 5 μl, column model: 1×PLgel 10 μm MiniMix-B (250×4.6 mm)+1×PLgel 10 μm MiniMix-B (250×4.6 mm)+1×PLgel 10 μm MiniMix-B Guard (50×4.6 mm), equipment name: Agilent 1200 series system, refractive index detector: Agilent G1362 RID, RI temperature: 35° C., data processing: Agilent ChemStation S/W, and test method (Mn, Mw, and PDI): OECD TG 118.

For example, based on a total weight of the thermoplastic polyester elastomer resin, the aliphatic diol can be included in an amount of 19 to 40% by weight, preferably 22 to 35% by weight, more preferably 24 to 35% by weight. Within this range, reaction can proceed smoothly, and physical property balance between flexibility and mechanical strength can be excellent.

The polyalkylene oxide is an aliphatic polyester as a soft segment, and can include, for example, one or more selected from the group consisting of polyethylene glycol, polypropylene glycol, polytetramethylene glycol, polyhexamethylene glycol, a copolymer of ethylene oxide and propylene oxide, an ethylene oxide addition polymer of polypropylene glycol, and a copolymer of ethylene oxide and tetrahydrofuran, preferably polytetramethylene glycol.

For example, based on a total weight of the thermoplastic polyester elastomer resin, the polyalkylene oxide can be included in an amount of 10 to 50% by weight, preferably 15 to 45% by weight, more preferably 20 to 40% by weight. Within this range, flexibility, mechanical strength, and heat resistance can be excellent, and thus physical property balance can be excellent.

For example, the polyalkylene oxide can have a number average molecular weight of 600 to 3,000 g/mol, preferably 1,000 to 2,000 g/mol. Within this range, polymerization reaction can proceed stably, and a thermoplastic polyester elastomer resin having excellent physical property balance can be obtained.

The polyalkylene oxide can preferably a polypropylene glycol having an end group capped with ethylene oxide. In this case, polymerization reactivity can be excellent.

The thermoplastic polyester elastomer resin can preferably include a branching agent. In this case, the melt viscosity and melt tension of an elastomer resin can be increased.

For example, the branching agent can include one or more selected from the group consisting of glycerol, pentaerythritol, trimellitic anhydride, trimellitic acid, trimethylol propane, and neopentyl glycol, preferably trimellitic anhydride.

For example, based on 100% by weight in total of the thermoplastic polyester elastomer resin, the branching agent can be included in an amount of 0.05 to 0.1% by weight, preferably 0.05 to 0.09% by weight, more preferably 0.06 to 0.09% by weight. Within this range, due to increase in melt viscosity, the melt viscosity of the elastomer resin can be controlled, and consequently, the intrinsic viscosity thereof can be easily controlled during melt polymerization.

For example, the thermoplastic polyester elastomer resin can be prepared by melt polymerization of aromatic dicarboxylic acid or an ester-forming derivative thereof, aliphatic diol, and polyalkylene oxide. In this case, physical property balance between flexibility, mechanical strength, and heat resistance can be excellent, and moldability can be further improved.

The thermoplastic polyester elastomer resin can preferably be prepared by solid-state polymerization of the resin prepared by melt polymerization. In this case, physical property balance between flexibility, mechanical strength, and heat resistance can be excellent, and moldability can be further improved.

Preferably, the thermoplastic polyester elastomer resin can be prepared by obtaining a bis(4-hydroxy)butyl terephthalate (BHBT) oligomer through transesterification of aromatic dicarboxylic acid, an aliphatic diol, and a polyalkylene oxide at 140 to 215° C. for 110 to 130 minutes in the presence of a titanium butoxide (TBT) catalyst; adding the TBT catalyst once more; and then performing melt polymerization at 215 to 245° C. for 110 to 130 minutes while reducing pressure stepwise from 760 torr to 0.3 torr.

The melt polymerization reaction can be performed until melt flow rate (MFR) measured at 230° C. under a load of 2.16 kg according to ASTM D1238 is 20 g/10 min. After completion of the reaction, the product can be discharged from a reactor by nitrogen pressure, and can be obtained in the form of pellets through pelletizing strands.

Then, the pellets can be subjected to solid-state polymerization under an inert atmosphere, such as nitrogen atmosphere, in a solid-state polymerization reactor or a rotatable vacuum dryer at 140 to 200° C. for 10 to 24 hours.

The solid-state polymerization can be performed until melt flow rate (MFR) measured at 230° C. under a load of 2.16 kg according to ASTM D1238 is 10 g/10 min or less, preferably 1 to 10 g/10 min, more preferably 3 to 8 g/10 min.

The degree of vacuum applied during the solid-state polymerization can be selected within the degree of vacuum commonly used in the art to which the present invention pertains, without particular limitation.

The solid-state polymerization reactor can be a vessel vacuum dryer connected to a rotatable high vacuum pump, and the inert atmosphere can be nitrogen atmosphere.

The thermoplastic polyester elastomer resin can have a melt flow rate of 0.5 to 10 g/10 min, preferably 0.5 to 6 g/10 min as measured at 230° C. under a load of 2.16 kg according to ASTM D1238. Within this range, moldability can be excellent.

For example, the thermoplastic polyester elastomer resin can have a Shore hardness of 30 D to 50 D, preferably 35 D to 47 D, more preferably 37 D to 42 D. Within this range, a composition having excellent flexibility and mechanical strength can be obtained.

In the present disclosure, unless otherwise specified, Shore hardness can be measured according to the method specified in ISO 868 (type D).

B) Glycidyl Group-Modified Olefin-Based Rubber Polymer

The glycidyl group-modified olefin-based rubber polymer (B) serves to increase melt viscosity and melt strength, and to extend a chain during extrusion, that is, to increase molecular weight.

For example, based on a total weight of components (A) to (C), the glycidyl group-modified olefin-based rubber polymer (B) can be included in an amount of 1.5 to 5.5% by weight, preferably 2 to 5.5% by weight, more preferably 2.5 to 5% by weight, still more preferably 2.5 to 4.5% by weight, still more preferably 2.5 to 3.5% by weight. Within this range, due to excellent hardness, mechanical properties, and fluidity, a high-quality product can be applied to a constant velocity joint boot requiring excellent moldability.

For example, based on a total weight of the glycidyl group-modified olefin-based rubber polymer (B), the glycidyl group-modified olefin-based rubber polymer (B) can be prepared by graft-polymerizing 6 to 20%, preferably 6 to 15% by weight, more preferably 6 to 10% by weight by weight of glycidyl (meth)acrylate. Within this range, due to increase in melt viscosity and melt tension, moldability can be excellent.

For example, the (meth)acrylate can be an acrylate, methacrylate, or a mixture thereof.

For example, the glycidyl group-modified olefin-based rubber polymer (B) includes a unit represented by Chemical Formula 1 below. In this case, impact resistance can be excellent.

[Chemical Formula 1]

In Chemical Formula 1, R is an alkyl group having 1 to 10 carbon atoms, preferably an alkyl group having 1 to 5 carbon atoms, more preferably an alkyl group having 1 to 3 carbon atoms, still more preferably an alkyl group having 1 to 2 carbon atoms. In this case, impact strength can be excellent.

In the unit represented by Chemical Formula 1, the number of repetitions (n) of the unit is preferably an integer of 1 to 2,000, more preferably an integer of 1 to 1,000, still more preferably an integer of 1 to 20. Within this range, impact strength can be excellent.

Preferably, the glycidyl group-modified olefin-based rubber polymer (B) can be a polyethylene-based copolymer onto which a compound represented by Chemical Formula 1 and glycidyl (meth)acrylate are grafted. In this case, impact strength can be excellent.

More preferably, the glycidyl group-modified olefin-based rubber polymer (B) can be a polymer obtained by grafting glycidyl (meth)acrylate onto a polyolefin-based rubber copolymer, still more preferably a polymer obtained by grafting glycidyl (meth)acrylate onto ethylene-octene rubber. In this case, impact resistance can be excellent.

For example, the olefin-based rubber copolymer can be rubber obtained by copolymerizing two or more olefins, preferably rubber obtained by polymerizing ethylene and an α-olefin containing 3 to 12 carbon atoms, more preferably rubber obtained by polymerizing ethylene and an α-olefin containing 4 to 8 carbon atoms. In this case, melt viscosity and melt tension can be increased.

For example, the α-olefin can include one or more selected from the group consisting of propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbornadiene, ethylidene norbornene, phenylnorbornene, vinylnorbornene, dicyclopentadiene, 1,4-butadiene, 1,5-pentadiene, 1,6-hexadiene, styrene, α-methylstyrene, divinylbenzene, and 3-chloromethylstyrene.

The polyolefin-based rubber polymer can include preferably one or more selected from the group consisting of ethylene-1-butene rubber, ethylene-butylene rubber, ethylene-1-pentene rubber, ethylene-1-hexene rubber, ethylene-1-heptene rubber, ethylene-1-octene rubber, and ethylene-4-methyl-1-pentene rubber, more preferably ethylene-1-octene rubber (EOR). In this case, melt viscosity and melt tension can be increased.

For example, the glycidyl group-modified olefin-based rubber polymer (B) can have a melt flow rate of 1 to 5 g/10 min, preferably 2 to 4 g/10 min as measured at 190° C. under a load of 2.16 kg according to ASTM D1238. Within this range, melt viscosity and melt tension can be increased.

In the present disclosure, the content of a monomer in a polymer can mean the weight (wt %) of the monomer added during preparation of the polymer or the weight (wt %) of a unit derived from the monomer.

C) Ionomer Resin

For example, based on a total weight of components (A) to (C), the ionomer resin (C) can be included in an amount of 1.5 to 5.5% by weight, preferably 2 to 5.5% by weight, more preferably 2.5 to 5% by weight, still more preferably 2.5 to 4.5% by weight, still more preferably 2.5 to 3.5% by weight. Within this range, due to increase in melt viscosity and melt tension, moldability can be improved, and appearance can be excellent.

The ionomer resin (C) serves to increase the melt viscosity of the thermoplastic polyester elastomer resin (A) by inducing entanglement between the chains of the thermoplastic polyester elastomer resin (A).

For example, the ionomer resin (C) can include a carboxyl group or sulfonic acid group in which a hydrogen ion is substituted with a metal cation. In this case, the melt viscosity and melt tension of the thermoplastic polyester elastomer resin can be increased.

For example, the metal cation can include one or more selected from the group consisting of Zn, Na, Mg, and Li, preferably Zn, Na, or a mixture thereof. In this case, processability can be excellent.

The ionomer resin (C) can be preferably a resin having a structure in which a hydrogen contained in a carboxyl group included in a copolymer composed of an α-olefin and (meth)acrylic acid or a derivative thereof is substituted with a metal ion. The ionomer can be obtained by preparing a functional group-containing olefin by copolymerizing an α-olefin and (meth)acrylic acid or a derivative thereof and then substituting a part of the functional group such as a carboxyl group contained in the obtained copolymer with a metal ion.

For example, the α-olefin can include one or more selected from the group consisting of propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbornadiene, ethylidene norbornene, phenylnorbornene, vinylnorbornene, dicyclopentadiene, 1,4-butadiene, 1,5-pentadiene, 1,6-hexadiene, styrene, α-methylstyrene, divinylbenzene, and 3-chloromethylstyrene.

For example, the (meth)acrylic acid can be acrylic acid, methacrylic acid, or a mixture thereof.

For example, the derivative of the (meth)acrylic acid can be a derivative of acrylic acid, a derivative of methacrylic acid, or a mixture thereof.

The ionomer resin (C) can be preferably a resin in which the carboxylic acid of methacrylic acid in an ethylene-methacrylic acid copolymer is substituted with a metal ion, more preferably a resin in which the carboxylic acid of methacrylic acid in an ethylene-methacrylic acid copolymer is substituted with a sodium ion, as shown in Chemical Formula 2 below. In this case, due to increase in melt viscosity and melt tension, moldability and surface appearance can be improved.

[Chemical Formula 2]

In Chemical Formula 2, m and n represent an average degree of polymerization, and are each independently an integer of 2 to 30,000, preferably an integer of 10 to 28,000, more preferably an integer of 100 to 12,000.

For example, the ionomer resin (C) can have a melt flow rate of 0.1 to 5 g/10 min, preferably 0.3 to 3 g/10 min, more preferably 0.5 to 2 g/10 min, still more preferably 0.7 to 1.5 g/10 min as measured at 190° C. under a load of 2.16 kg according to ASTM D1238. Within this range, due to increase in melt viscosity and melt tension, moldability and surface appearance can be excellent.

According to the present invention, by combination of the glycidyl group-modified olefin-based rubber polymer (B) and the ionomer resin (C), a synergistic effect of increasing melt viscosity and melt tension and reducing melt flow rate can be obtained, thereby improving moldability and suppressing occurrence of flow marks inside a molded article. Thus, a high-quality molded article can be manufactured, and the molded article can be applied to automobile parts, in particular a constant velocity joint boot.

The weight ratio (B:C) of the glycidyl group-modified olefin-based rubber polymer (B) to and the ionomer resin (C) can be preferably 4:6 to 6:4, more preferably 4.5:5.5 to 5.5:4.5. Within this range, a synergistic effect of increasing melt viscosity and melt tension and reducing melt flow rate can be maximized.

For example, based on a total weight of components (A) to (C), a total weight of the glycidyl group-modified olefin-based rubber polymer (B) and the ionomer resin (C) can be 4.5 to 11% by weight, preferably 4.5 to 9% by weight, more preferably 5 to 7% by weight. Within this range, hardness and mechanical properties can be excellent, and a synergistic effect of increasing melt viscosity and melt tension and reducing melt flow rate can be maximized.

Thermoplastic Polyester Elastomer Resin Composition

When thermoplastic polyester elastomer resin composition pellets are discharged in the form of sheet through a T-die (die width: 150 mm, die thickness: 1.5 T) at 60 rpm and a cylinder temperature of 230° C. using a single-screw extruder (screw diameter: 30 Φ, screw length: 1 m), and time taken for the sheet discharged from the T-die to drop from a height a distance of 120 cm, i.e., drop time, is measured, the thermoplastic polyester elastomer resin composition can have a drop time of preferably 60 to 120 seconds, more preferably 70 to 110 seconds, still more preferably 70 to 100 seconds. Within this range, moldability and surface appearance can be excellent, and occurrence of flow marks can be suppressed. Thus, a high-quality composition can be manufactured, and the composition can be applied to a constant velocity joint boot. When drop time is out of the range, moldability and surface appearance can be poor, and flow marks can occur.

The drop time is an index for evaluating melt tension. That is, as drop time increases, melt tension increases.

In the present disclosure, drop time can be measured at room temperature.

In the present disclosure, room temperature can be within the range of 20±5° C.

The thermoplastic polyester elastomer resin composition can have a melt flow rate of preferably 5 to 16 g/10 min, more preferably 6 to 15 g/10 min, still more preferably 8 to 15 g/10 min, still more preferably 8 to 13 g/10 min as measured at 230° C. under a load of 10 kg according to ISO 1133. Within this range, moldability and physical property balance can be excellent.

When, according to ISO 868, two square specimens having a size of 100 mm×100 mm×2 T are arranged so that the square specimens overlap, and the hardness thereof is measured 15 seconds after contact with a hardness tester, the thermoplastic polyester elastomer resin composition can have a hardness of preferably 35 or more, more preferably 37 to 43, still more preferably 37 to 40. Within this range, mechanical properties and physical property balance can be excellent.

When a specimen having a size of 100 mm×100 mm×2 T is punched in the form of dumbbell according to ISO 527-2-5A, and the tensile strength thereof is measured at a cross head speed of 200 mm/min according to ISO 527-2, the thermoplastic polyester elastomer resin composition can have a tensile strength of preferably 15 MPa or more, more preferably 20 MPa or more, still more preferably 20 to 30 MPa. Within this range, mechanical properties and physical property balance can be excellent.

When a specimen having a size of 100 mm×100 mm×2 T is punched in the form of dumbbell according to ISO 527-2-5A, and the tensile strength thereof is measured at a cross head speed of 200 mm/min according to ISO 527-2, the thermoplastic polyester elastomer resin composition can have an elongation of 370% or more, more preferably 400% or more, still more preferably 400 to 520%, still more preferably 450 to 500%. Within this range, mechanical properties and physical property balance can be excellent.

In the present disclosure, tensile strength and elongation can be measured at a cross head speed of 200 mm/min using UTM equipment (Zwick Z050) according to ISO 527-2.

When thermoplastic polyester elastomer resin composition pellets are fed into the barrel of a blow molding machine set to 220 to 240° C. and melt and discharged in the form of parison, and then time taken for the discharged material to be blow-molded and hardened in a mold set to 20 to 40° C., i.e., cycle time, is measured, the thermoplastic polyester elastomer resin composition can have a cycle time of preferably 20 to 60 seconds, more preferably 20 to 50 seconds, still more preferably 25 to 40 seconds. Within this range, moldability, surface appearance, and physical property balance can be excellent, and productivity can be increased.

In the present disclosure, when manufacturing one product by blow molding, pellets are fed into the barrel of a blow molding machine set to 220 to 240° C. and melted and discharged in the form of parison. Then, the discharged material is blow-molded and hardened in a mold set to 20 to 40° C. In this case, time required for the blow molding and hardening is referred to as cycle time. The cycle time for the one product is regarded as one cycle.

In the present disclosure, a press blower (model name: DSE150, OSSBURGE® Co.) is used as the blow molding machine.

Additives

For example, the thermoplastic polyester elastomer resin composition can include one or more selected from the group consisting of an antioxidant, a hindered amine-based light stabilizer (HALS), a lubricant, and a black masterbatch. In this case, required physical properties can be effectively implemented without deterioration in the intrinsic physical properties of the thermoplastic polyester elastomer resin composition of the present invention.

For example, the antioxidant can include one or more selected from the group consisting of a phosphorus antioxidant, a sulfur antioxidant, a hindered phenolic antioxidant, and a diphenylamine antioxidant, preferably a hindered phenolic antioxidant, a diphenylamine antioxidant, or a mixture thereof. In this case, oxidation by heat can be prevented during an extrusion process, and mechanical properties and heat resistance can be excellent.

For example, based on a total weight of components (A) to (C) and the antioxidant, the antioxidant can be included in an amount of 0.1 to 2% by weight, preferably 0.3 to 1.5% by weight, more preferably 0.3 to 1.2% by weight. Within this range, oxidation by heat can be prevented during an extrusion process, and mechanical properties and heat resistance can be excellent.

For example, the phosphorus antioxidant can include one or more selected from the group consisting of tris-(mixed mono and dinonyl phenyl) phosphite, tris(2,3-di-t-butyl phenyl) phosphite, 4,4'-butylidene bis(3-methyl-6-t-butyl phenyl-di-tridecyl)phosphite, 1,1,3-tris(2-methyl-4-di-tridecyl phosphite-5-t-butyl phenyl) butane, bis(2,4-di-t-butylphenyl) pentaerythritol-di-phosphite, tetrakis(2,4-di-t-butyl phenyl)-4,4'-biphenylene phosphanite, bis(2,6-di-t-butyl-4-methyl phenyl) pentaerythritol-di-phosphite, 2,2'-ethylidene bis(4,6-di-t-butyl phenyl)-2-ethylhexyl-phosphite, bis(2,4,6-di-t-butyl phenyl) pentaerythritol-di-phosphite, triphenylphosphite, diphenyldecyl phosphite, dodecyl phenyl phosphite, tridecyl phosphite, trioctyl phosphite, tridodecyl phosphite, trioctadecyl phosphite, trinonyl phenyl phosphite, and tridodecyl trithiophosphite.

For example, the sulfur antioxidant can include one or more selected from the group consisting of dilauryl-3,3'-thiodipropionic acid ester, dimyristyl-3,3'-thiodipropionic acid ester, distearyl-3,3'-thiodipropionic acid ester, lauryl stearyl-3,3'-thiodipropionic acid ester, and pentaerythritol tetrakis(3-laurylthiopropion ester).

For example, the hindered phenolic antioxidant can be [3-[3-(4-hydroxy-3,5-ditert-butyl-phenyl)propanoyloxy]-2,2-bis[3-(4-hydroxy-3,5-ditert-butyl-phenyl)propanoyloxymethyl]propyl]3-(4-hydroxy-3,5-ditert-butyl-phenyl) propanoate.

For example, the diphenylamine antioxidant can include one or more selected from the group consisting of phenylnaphthylamine, 4,4'-dimethoxy diphenyl amine, 4,4'-bis(α,α-dimethylbenzyl)diphenylamine, and 4-isopropoxy diphenyl amine, preferably 4,4'-bis(α,α-dimethylbenzyl)diphenylamine.

When the hindered phenolic antioxidant and the diphenylamine antioxidant are included, due to the synergistic effect of combination thereof, mechanical properties and moldability can be further improved.

The light stabilizer can be preferably a hindered amine-based light stabilizer (HALS).

For example, the hindered amine-based light stabilizer (HALS) one or more selected from the group consisting of poly[[6-[(1,1,3,3-tetramethylbutyl)amino]-1,3,5-triazine-2,4-diyl][(2,2,6,6-tetramethyl-4-piperidinyl)imino]-1,6-hexanediyl[(2,2,6,6-tetramethyl-4-piperidinyl)imino]], bis(2,2,6,6-tetramethyl-4-piperidyl)sebacate, decane-2-acid bis(2,2,6,6-tetramethyl-1(octyloxy)-4-piperidinyl)ester, 1,1-dimethylethyl hydroperoxide, bis(1,2,2,6,6-pentamethyl-4-piperidyl[[3,5-bis(1,1dimethylethyl)-4-hydroxyphenyl]methyl]butylmalonate, bis(1,2,2,6,6-pentamethyl-4-piperidyl)-sebacate, and methyl-1,2,2,6,6-pentamethyl-4-piperidylsebacate, preferably poly[[6-[(1,1,3,3-tetramethylbutyl)amino]-1,3,5-triazine-2,4-diyl][(2,2,6,6-tetramethyl-4-piperidinyl)imino]-1,6-hexanediyl[(2,2,6,6-tetramethyl-4-piperidinyl) imino]]. In this case, mechanical strength can be maintained, heat resistance can be further improved, and discoloration can be prevented.

For example, based on a total weight of components (A) to (C) and the light stabilizer, the light stabilizer can be included in an amount of 0.05 to 2% by weight, preferably 0.1 to 1% by weight, more preferably 0.1 to 0.5% by weight. Within this range, mechanical strength can be maintained, heat resistance can be further improved, and discoloration can be prevented.

For example, the lubricant can include one or more selected from the group consisting of a fatty acid amide-based compound, montane-based wax, and olefin-based wax, preferably one or more selected from the group consisting of a fatty acid amide-based compound and montane-based wax. In this case, compatibility with an elastomer resin can be increased, thereby reducing surface defects.

For example, the fatty acid amide-based compound can include one or more selected from the group consisting of stearamide, behanamide, ethylene bis(stearamide), N,N'-ethylene bis(12-hydroxy stearamide), erucamide, oleamide, and ethylene bis oleamide.

For example, the montane-based wax can be montane wax, montane ester wax, or a mixture thereof.

For example, the olefin-based wax can be polyethylene wax, polypropylene wax, or a mixture thereof.

For example, the montane ester wax can include one or more selected from wax obtained by esterifying a montane-based wax with ethylene glycol and montanic acid, wax obtained by esterifying a montane-based wax with glycerin and montanic acid, calcium montanate containing montanic acid ester, and ester-mixed wax based on montanic acid.

For example, based on a total weight of components (A) to (C) and the lubricant, the lubricant can be included in an amount of 0.1 to 3% by weight, preferably 0.3 to 2.5% by weight, more preferably 0.5 to 2% by weight. Within this range, compatibility with an elastomer resin can be increased, thereby reducing surface defects. In addition, mechanical properties can be excellent.

For example, the black masterbatch can be a carbon black masterbatch, preferably a carbon black masterbatch using a thermoplastic polyester elastomer resin as a carrier resin. In this case, compatibility with the thermoplastic polyester elastomer resin can be excellent. Thus, carbon black can be uniformly dispersed, and compounding can be performed easily.

For example, based on a total weight of components (A) to (C) and the black masterbatch, the black masterbatch can be included in an amount of 0.1 to 3% by weight, preferably 0.3 to 2.5% by weight, more preferably 0.5 to 2% by weight. Within this range, compatibility with an elastomer resin can be excellent. Thus, carbon black can be uniformly dispersed, and compounding can be performed easily.

The thermoplastic polyester elastomer resin composition can further include one or more additives selected from the group consisting of a UV absorber, a heat stabilizer, an antistatic agent, an antibacterial agent, a processing aid, an anti-friction agent, an anti-wear agent, a metal deactivator, and a coupling agent. In this case, based on 100 parts by weight in total of components (A) to (C), each of the additives can be included in an amount of 0.01 to 5 parts by weight, preferably 0.05 to 3 parts by weight, more preferably 0.1 to 2 parts by weight, still more preferably 0.2 to 1.5 parts by weight. Within this range, required physical properties can be effectively implemented without deterioration in the intrinsic physical properties of the thermoplastic polyester elastomer resin composition of the present invention.

Method of Preparing Thermoplastic Polyester Elastomer Resin Composition

A method of preparing a thermoplastic polyester elastomer resin composition according to the present invention includes a step of preparing pellets by kneading and extruding 89 to 96% by weight of a thermoplastic polyester elastomer resin (A), 1.5 to 5.5% by weight of a glycidyl group-modified olefin-based rubber polymer (B), and 1.5 to 5.5% by weight of an ionomer resin (C) at 200 to 300° C. and 150 to 350 rpm. In this case, hardness and mechanical properties can be excellent, moldability can be excellent due to increase in melt tension, and occurrence of flow marks on the inner surface of a molded article can be suppressed. Thus, a high-quality thermoplastic polyester elastomer resin composition can be manufactured, and can be applied to automobile parts, in particular a constant velocity joint boot.

For example, the kneading and extrusion can be performed using a single-screw extruder, a twin-screw extruder, or a Banbury mixer. In this case, due to uniform dispersion of the composition, compatibility can be excellent.

The kneading and extrusion can be performed at a barrel temperature of preferably 200 to 260° C., more preferably 210 to 240° C. In this case, a throughput per unit time can be appropriate, melt-kneading can be sufficiently performed, and thermal decomposition of a resin component can be suppressed.

For example, the kneading and extrusion can be performed at a screw rotation rate of 150 to 350 rpm, preferably 200 to 300 rpm, more preferably 230 to 270 rpm. In this case, a throughput per unit time can be appropriate, and process efficiency and physical properties of a composition can be excellent.

Molded articles used in various industrial fields can be manufactured using the resin composition through a molding process such as a blow process and an injection process.

The description of the method of preparing a thermoplastic polyester elastomer resin composition includes the description of the above-described thermoplastic polyester elastomer resin composition, and repeated description thereof is omitted.

Molded Article

For example, a molded article of the present invention includes the thermoplastic polyester elastomer resin composition of the present invention. In this case, moldability can be excellent, and occurrence of flow marks on the inner surface of a molded article can be suppressed.

The molded article can be an automobile part, preferably a constant velocity joint boot, a rack and pinion boot, a propeller shaft boot, a dust cover, or bellows.

A method of manufacturing the molded article preferably includes a step of melt-kneading and extruding 89 to 96% by weight of a thermoplastic polyester elastomer resin (A), 1.5 to 5.5% by weight of a glycidyl group-modified olefin-based rubber polymer (B), and 1.5 to 5.5% by weight of an ionomer resin (C) at 200 to 300° C. and 150 to 350 rpm to prepare pellets; and a step of blow molding the prepared pellets using a blow molding machine. In this case, the melt tension of the thermoplastic polyester elastomer resin composition can be increased, thereby improving moldability and minimizing occurrence of flow marks on the inner surface of a molded article. Thus, a high-quality molded article can be manufactured, and can be applied to a constant velocity joint boot for automobiles.

The description of the method of manufacturing a molded article includes the description of the above-described thermoplastic polyester elastomer resin composition, and repeated description thereof is omitted.

In describing the thermoplastic polyester elastomer resin composition of the present invention, the method of preparing the same, and the molded article including the same, it should be noted that other conditions or equipment not explicitly described herein can be appropriately selected within the range commonly practiced in the art without particular limitation.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications can be made without departing from the spirit and scope of the present invention, and such changes and modifications are also within the scope of the appended claims.

EXAMPLES

Materials used in Examples and Comparative Examples are as follows.

- TPEE (A): KEYFLEX BT2140D (LG Chemical Co.) having a melt flow rate (230° C., 2.16 kg) of 5 g/10 min and a Shore D hardness of 40 D
- Glycidyl group-modified olefin-based rubber polymer (B): EOR-GMA (KT20, glycidyl methacrylate content: 6 to 9% by weight, K&A TRADD Co.)
- Ionomer resin (C): Surlyn 8920 (melt flow rate (190° C., 2.16 kg): 0.9 g/10 min, substituted metal: Na; Dupont Co.)
- Hindered phenolic antioxidant: IR1010 (BASF Co.)
- Diphenylamine antioxidant: Naugard445 (SUNFINE GLOBAL Co.)
- Hindered amine-based light stabilizer (HALS): CHIMASSORB 944 (BASF Co.)
- Lubricant: OP-WAX (Clariant Co.), Incroslip G (Croda Co.)
- Black masterbatch: M40C (LG Chemical Co.)

Examples 1 to 6 and Comparative Examples 1 to 6

According to the contents and components shown in Tables 1 and 2 below, the components were kneaded and extruded at an extrusion temperature of 230° C. and a screw rotation rate of 250 rpm using a twin-screw extruder to prepare pellets. The melt flow rate of the prepared pellets was measured. In addition, the prepared pellets were injected at an injection temperature of 230° C., a mold temperature of 40° C., and an injection speed of 20 mm/min using an injection machine (ENGEL 80 MT) to prepare an injection specimen, and the physical properties of the injection specimen were measured.

Test Examples

The properties of the specimens prepared in Examples 1 to 6 and Comparative Examples 1 to 6 were measured according to the following methods, and the results are shown in Tables 1 and 2 below.

Measurement Methods

Melt flow rate: Melt flow rate was measured at 230° C. under a load of 10 kg for 10 minutes according to ISO 1133. Here, the unit of melt flow rate is g/10 min.

Hardness (Shore D): According to ISO 868, two square specimens having a size of 100 mm×100 mm×2 T were arranged so that the square specimens overlapped, and the hardness thereof was measured 15 seconds after contact with a hardness tester.

Tensile strength (MPa) and elongation (%): A specimen having a size of 100 mm×100 mm×2 T was punched in the form of dumbbell according to ISO 527-2-5A, and the tensile strength and elongation thereof were measured at a cross head speed of 200 mm/min using UTM equipment (Zwick Z050) according to ISO 527-2.

Figure 2:
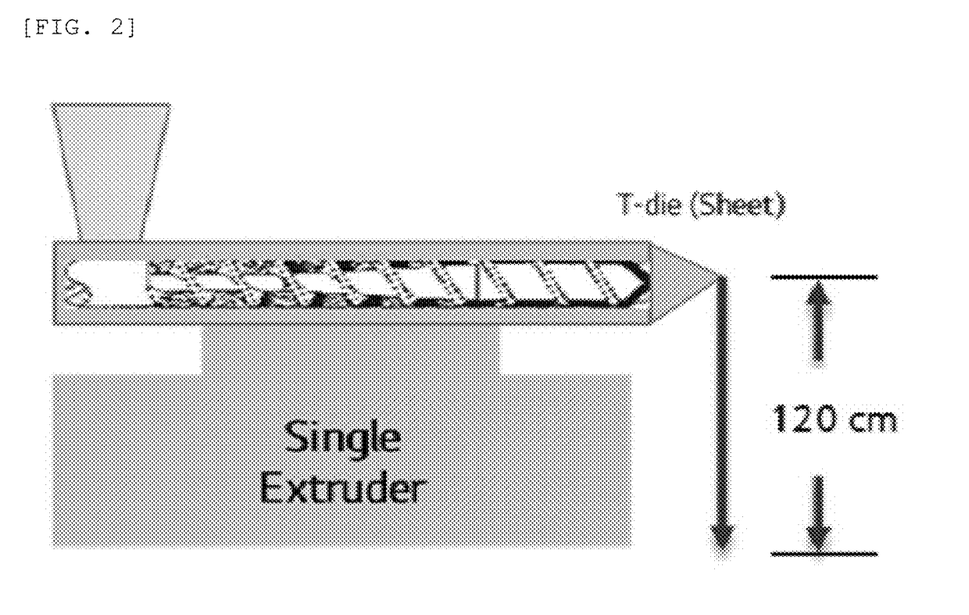
FIG. 2 schematically illustrates a method of measuring drop time.

Drop time (seconds): As shown in FIG. 2 below, thermoplastic polyester elastomer resin composition pellets were discharged in the form of sheet through a T-die (die width: 150 mm, die thickness: 1.5 T) at 60 rpm and a cylinder temperature of 230° C. using a single-screw extruder (screw diameter: 30 Φ, screw length: 1 m), and time taken for the sheet discharged from the T-die to drop from a height a distance of 120 cm was measured.

Whether flow marks occur on inner surface: Thermoplastic polyester elastomer resin composition pellets were blow-molded at a molding temperature of 220 to 240° C. using a blow molding machine (Pressblower, model name: DSE150, OSSBURGE® Co.) to manufacture a CVJ boot. The inside of the molded article was visually observed, and the degree of occurrence of flow marks was evaluated as follows.

⊚: No flow marks and excellent appearance

○: Fine flow marks and good appearance

Δ: Flow marks are observed intermittently, and normal appearance

X: Obvious flow marks and deterioration in appearance

XX: Large number of flow marks and poor appearance

Cycle time (seconds): The thermoplastic resin composition pellets were fed into the barrel of a blow molding machine (Pressblower, model name: DSE150, OSSBURGER Co.) set to 220 to 240° C. and melt and discharged in the form of parison. Then, time taken for the discharged material to be blow-molded and hardened in a mold set to 20 to 40° C. was measured.

TABLE 1

| Classification (wt %) | Example 1 | Example 2 | Example 3 | Example 4 | Example 5 | Example 6 |
|---|---|---|---|---|---|---|
| TPEE (A) | 90.3 | 90.8 | 90.3 | 90.3 | 90.8 | 89.3 |
| EOR-GMA (B) | 3 | 2.5 | 2 | 4 | 3 | 3.5 |
| Ionomer (C) | 3 | 3 | 4 | 2 | 2.5 | 3.5 |
| Antioxidant (IR-1010) | 0.5 | 0.5 | 0.5 | 0.5 | 0.5 | 0.5 |
| Antioxidant (NAugard-445) | 0.5 | 0.5 | 0.5 | 0.5 | 0.5 | 0.5 |
| HALS (CHIMASSORB 944) | 0.2 | 0.2 | 0.2 | 0.2 | 0.2 | 0.2 |
| Lubricant (OP WAX) | 0.5 | 0.5 | 0.5 | 0.5 | 0.5 | 0.5 |
| Lubricant (Incroslip G) | 0.5 | 0.5 | 0.5 | 0.5 | 0.5 | 0.5 |
| Black masterbatch | 1.5 | 1.5 | 1.5 | 1.5 | 1.5 | 1.5 |
| Physical properties | | | | | | |
| Hardness (Shore-D) | 38 | 37.5 | 37.5 | 37.5 | 37 | 38 |
| Tensile strength (MPa) | 23 | 22 | 22 | 21.5 | 22 | 23 |
| Elongation (%) | 450 | 470 | 480 | 430 | 460 | 430 |
| Melt flow rate (g/10 min) | 10 | 15 | 9 | 7 | 13 | 6 |
| Drop time (sec.) | 84 | 70 | 88 | 96 | 78 | 106 |
| Whether flow marks occur on inner surface | ○ | ◉ | ◉ | ○ | ◉ | ○ |
| Cycle time (sec.) | 27 | 27 | 27 | 27 | 27 | 27 |

TABLE 2

| Classification (wt %) | Comparative Example 1 | Comparative Example 2 | Comparative Example 3 | Comparative Example 4 | Comparative Example 5 | Comparative Example 6 |
|---|---|---|---|---|---|---|
| TPEE (A) | 93.3 | 93.3 | 92.3 | 86.3 | 92.3 | 86.3 |
| EOR-GMA (B) | 3 | 0 | 3 | 3 | 1 | 7 |
| Ionomer (C) | 0 | 3 | 1 | 7 | 3 | 3 |
| Antioxidant (IR-1010) | 0.5 | 0.5 | 0.5 | 0.5 | 0.5 | 0.5 |
| Antioxidant (NAugard-445) | 0.5 | 0.5 | 0.5 | 0.5 | 0.5 | 0.5 |
| HALS (CHIMASSORB 944) | 0.2 | 0.2 | 0.2 | 0.2 | 0.2 | 0.2 |
| Lubricant (OP WAX) | 0.5 | 0.5 | 0.5 | 0.5 | 0.5 | 0.5 |
| Lubricant (Incroslip G) | 0.5 | 0.5 | 0.5 | 0.5 | 0.5 | 0.5 |
| Black masterbatch | 1.5 | 1.5 | 1.5 | 1.5 | 1.5 | 1.5 |
| Physical properties | | | | | | |
| Hardness (Shore-D) | 37 | 37 | 37 | 38 | 37 | 36.5 |
| Tensile strength (MPa) | 22.5 | 22.5 | 22 | 25 | 23 | 25 |
| Elongation (%) | 460 | 490 | 460 | 400 | 460 | 400 |
| Melt flow rate (g/10 min) | 15 | 14 | 18 | 2 | 12 | 1 |
| Drop time (sec.) | 46 | 48 | 42 | 134 | 50 | 160 |
| Whether flow marks occur on inner surface | ◉ | ◉ | ◉ | XX | ◉ | XX |
| Cycle time (sec.) | 27 | 27 | 27 | 30 | 27 | 30 |

As shown in Tables 1 and 2, in the case of Examples 1 to 6 according to the present invention, compared to Comparative Examples 1 to 6 outside the range of the present invention, hardness, tensile strength, and elongation are excellent. In addition, since melt flow rate is within the range of 5 to 16 g/10 min, and drop time is within the range of 60 to 120 seconds, moldability is excellent. In addition, since no flow marks occur on the inner surface of a molded article, appearance is excellent.

Specifically, in the case of Comparative Example 1 including only the EOR-GMA (B) and Comparative Example 2 including only the ionomer resin (C), due to short drop time, moldability is poor.

In addition, Comparative Example 3 including a small amount of the ionomer resin (C) has a high melt flow rate and a short drop time, resulting in poor moldability. In the case of Comparative Example 4 including an excess of the ionomer resin (C), melt flow rate is very low and drop time is long, resulting in occurrence of a large number of flow marks on the inner surface of a molded article. Thus, the molded article has no commercial value.

In addition, in the case of Comparative Example 5 including a small amount of the EOR-GMA (B), due to reduction in drop time, moldability is poor. Comparative Example 6 including an excess of the EOR-GMA (B) has a very low melt flow rate and a very long drop time, resulting in poor moldability and occurrence of a large number of flow marks on the inner surface of a molded article, resulting in poor appearance.

Figure 1:
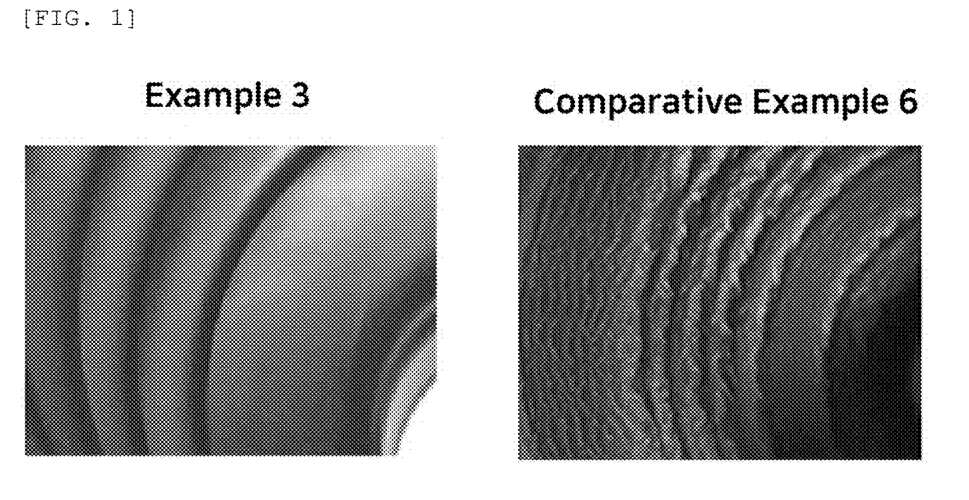
FIG. 1 includes images for observing whether flow marks occur on the inner surface of the molded article when the resin compositions of Example 3 and Comparative Example 6 are respectively blow-molded to manufacture a constant velocity joint boot.

When the resin compositions prepared in Comparative Example 6 and Example 3 were applied to an actual product, it was observed whether flow marks occurred inside the molded article, and the result images are shown in FIG. 1 below. In the case of Example 3, no flow marks were observed, and appearance was excellent. Thus, the resin composition of Example 3 was applicable to automotive parts. In the case of Comparative Example 6, a large number of flow marks was observed, and thus the resin composition of Comparative Example 6 could not be applied to a product.

In conclusion, the thermoplastic polyester elastomer resin composition according to the present invention including the thermoplastic polyester elastomer resin (A), the glycidyl group-modified olefin-based rubber polymer (B), and the ionomer resin (C) in a predetermined content ratio has excellent mechanical properties and moldability and is capable of suppressing occurrence of flow marks on the inner surface of a molded article. Thus, the high-quality thermoplastic polyester elastomer resin composition can be applied to a constant velocity joint boot.

The invention claimed is:

1. A thermoplastic polyester elastomer resin composition, comprising:
   89 to 96% by weight of a thermoplastic polyester elastomer resin (A);
   1.5 to 5.5% by weight of a glycidyl group-modified olefin-based rubber polymer (B); and
   1.5 to 5.5% by weight of an ionomer resin (C),
   wherein the thermoplastic polyester elastomer resin composition has a melt flow rate of 5 to 16 g/10 min as measured at 230° C. under a load of 10 kg according to ISO 1133.

2. The thermoplastic polyester elastomer resin composition according to claim 1, wherein, when pellets of the thermoplastic polyester elastomer resin composition are discharged in a form of a sheet through a T-die (die width: 150 mm, die thickness: 1.5 T) at 60 rpm and a cylinder temperature of 230° C. using a single-screw extruder (screw diameter: 30 Φ, screw length: 1 m), and a time taken for the sheet discharged from the T-die to drop from a height a distance of 120 cm, i.e., drop time, is measured, the thermoplastic polyester elastomer resin composition has a drop time of 60 to 120 seconds,
wherein the 1.5 T is 1.5 mm, and 30 Φ is 30 mm.

3. The thermoplastic polyester elastomer resin composition according to claim 1, wherein the thermoplastic polyester elastomer resin (A) has a melt flow rate of 0.5 to 10 g/10 min as measured at 230° C. under a load of 2.16 kg according to ISO 1133.

4. The thermoplastic polyester elastomer resin composition according to claim 1, wherein the thermoplastic polyester elastomer resin (A) is an elastomer resin comprising:
   an aromatic dicarboxylic acid or an ester-forming derivative thereof;
   an aliphatic diol; and
   a polyalkylene oxide.

5. The thermoplastic polyester elastomer resin composition according to claim 4, wherein the aromatic dicarboxylic acid comprises one or more selected from the group consisting of terephthalic acid, isophthalic acid, 2,6-naphthalene dicarboxylic acid, 1,5-naphthalene dicarboxylic acid, and 1,4-cyclohexane dicarboxylic acid.

6. The thermoplastic polyester elastomer resin composition according to claim 4, wherein the ester-forming derivative of the aromatic dicarboxylic acid comprises one or more selected from the group consisting of dimethyl terephthalate, dimethyl isophthalate, 2,6-dimethyl naphthalene dicarboxylate, and dimethyl 1,4-cyclohexane dicarboxylate.

7. The thermoplastic polyester elastomer resin composition according to claim 4, wherein the aliphatic diol comprises one or more selected from the group consisting of ethylene glycol, propylene glycol, 1,2-propanediol, 1,3-propanediol, 1,4-butanediol, 1,5-pentanediol, 1,6-hexanediol, and 1,4-cyclohexanedimethanol.

8. The thermoplastic polyester elastomer resin composition according to claim 4, wherein the polyalkylene oxide comprises one or more selected from the group consisting of polyethylene glycol, polypropylene glycol, polytetramethylene glycol, polyhexamethylene glycol, a copolymer of ethylene oxide and propylene oxide, an ethylene oxide addition polymer of polypropylene glycol, and a copolymer of ethylene oxide and tetrahydrofuran.

9. The thermoplastic polyester elastomer resin composition according to claim 1, wherein the glycidyl group-modified olefin-based rubber polymer (B) is a glycidyl (meth)acrylate-grafted polyolefin elastomer polymer obtained by graft-polymerizing glycidyl (meth)acrylate onto a polyolefin-based rubber copolymer.

10. The thermoplastic polyester elastomer resin composition according to claim 9, wherein, based on a total weight of the glycidyl group-modified olefin-based rubber polymer (B), the glycidyl group-modified olefin-based rubber polymer (B) comprises 6 to 20% by weight of glycidyl (meth)acrylate.

11. The thermoplastic polyester elastomer resin composition according to claim 1, wherein the ionomer resin (C) comprises a carboxyl group or sulfonic acid group in which a hydrogen ion is substituted with a metal cation.

12. The thermoplastic polyester elastomer resin composition according to claim 1, wherein the thermoplastic polyester elastomer resin composition comprises one or more selected from the group consisting of an antioxidant, a light stabilizer, a lubricant, and a black masterbatch.

13. A method of preparing a thermoplastic polyester elastomer resin composition, comprising preparing pellets by kneading and extruding 89 to 96% by weight of a thermoplastic polyester elastomer resin (A), 1.5 to 5.5% by weight of a glycidyl group-modified olefin-based rubber polymer (B), and 1.5 to 5.5% by weight of an ionomer resin (C) at 200 to 300° C. and 150 to 350 rpm, wherein the thermoplastic polyester elastomer resin composition has a melt flow rate of 5 to 16 g/10 min as measured at 230° C. under a load of 10 kg according to ISO 1133.

14. A molded article, comprising the thermoplastic polyester elastomer resin composition according to claim 1.

* * * * *